(12) United States Patent
Walton et al.

(10) Patent No.: US 7,535,606 B1
(45) Date of Patent: May 19, 2009

(54) CIS (CONTACT IMAGE SENSOR) RYB (RED-LUMINANCE-BLUE) SAMPLING

(75) Inventors: Derek T. Walton, Bolton, MA (US); Brendan P. Mullaly, Nashua, NH (US)

(73) Assignee: Conexant Systems, Inc., Newport Beach, CA (US)

( * ) Notice: Subject to any disclaimer, the term of this patent is extended or adjusted under 35 U.S.C. 154(b) by 608 days.

(21) Appl. No.: 11/032,478

(22) Filed: Jan. 10, 2005

Related U.S. Application Data

(60) Provisional application No. 60/535,398, filed on Jan. 9, 2004.

(51) Int. Cl.
- *G06F 15/00* (2006.01)
- *H04N 1/42* (2006.01)
- *G03F 3/10* (2006.01)

(52) U.S. Cl. .................... 358/509; 358/1.9; 358/501; 358/525; 358/527

(58) Field of Classification Search .................. 358/1.2, 358/2.99, 448, 501, 505, 509, 527; 348/405
See application file for complete search history.

(56) References Cited

U.S. PATENT DOCUMENTS

| | | | | |
|---|---|---|---|---|
| 5,416,614 A * | 5/1995 | Crawford | ................... | 358/530 |
| 6,035,058 A * | 3/2000 | Savakis et al. | ............... | 382/163 |
| 6,239,886 B1 * | 5/2001 | Klassen et al. | ............... | 358/518 |
| 7,102,679 B1 * | 9/2006 | Spears et al. | ................. | 348/312 |
| 7,170,645 B2 * | 1/2007 | Kim et al. | ................... | 358/3.27 |
| 2002/0051148 A1 * | 5/2002 | Izumi | ............. | 358/1.9 |
| 2002/0057469 A1 * | 5/2002 | Yushiya et al. | ............... | 358/509 |
| 2002/0140996 A1 * | 10/2002 | Spears et al. | ................. | 358/504 |
| 2003/0035056 A1 * | 2/2003 | Chen et al. | ................... | 348/273 |
| 2003/0169442 A1 * | 9/2003 | Yokochi | ..................... | 358/1.9 |
| 2003/0216337 A1 * | 11/2003 | Hallahan | ..................... | 514/44 |
| 2003/0234866 A1 * | 12/2003 | Cutler | ..................... | 348/207.1 |
| 2004/0114147 A1 * | 6/2004 | Yeoh et al. | ................... | 356/450 |

FOREIGN PATENT DOCUMENTS

| | | | |
|---|---|---|---|
| EP | 0766453 A1 * | 4/1997 | |
| EP | 001239664 A1 * | 9/2002 | |

OTHER PUBLICATIONS

Chan et al. "Video CCD based Portable Still Camera" Aug. 1995, IEEE, vol. 41, pp. 1-4.*
Ford et al. "Colour Space Conversions" Aug. 1998, IEEE, pp. 1-31.*

* cited by examiner

*Primary Examiner*—Mark K Zimmerman
*Assistant Examiner*—Haris Sabah
(74) *Attorney, Agent, or Firm*—John R. Thompson; Stoel Rives LLP

(57) ABSTRACT

A method of directly obtaining a Y value for a luminance/chrominance representation of a scanline of a color scanned image produced by a color contact image sensor device having a linear sensor array to collect reflected light, wherein said contact image sensor device comprises red, green and blue light sources and wherein an optimal on time for each of the light sources is calibrated, the method comprising the step of illuminating the scanline during a single pulse independently with the red, the green and the blue light sources and allowing the linear sensor array to accumulate the reflected light from all of the light sources.

17 Claims, 5 Drawing Sheets

```
┌─────────────────────────────────────────────────────────────────┐
│ Directly obtaining a luminance value (Y) of a luminance/chrominance │
│       representation using the method shown in Fig. 3            │
└─────────────────────────────────────────────────────────────────┘
                                │
                                ▼
┌─────────────────────────────────────────────────────────────────┐
│ Obtaining a R value for each scanline by illuminating each scanline of │
│    the document with the red light source for the optimal on time    │
│ determined for the red light source and detecting the reflected light in │
│                       the linear sensor array.                        │
└─────────────────────────────────────────────────────────────────┘
                                │
                                ▼
┌─────────────────────────────────────────────────────────────────┐
│ Obtaining a B value for each scanline by illuminating each scanline of │
│   the document with the blue light source for the optimal on time    │
│  determined for the blue light source and detecting the reflected light │
│                       in the linear sensor array.                      │
└─────────────────────────────────────────────────────────────────┘
                                │
                                ▼
┌─────────────────────────────────────────────────────────────────┐
│   Deriving a first chrominance value of the luminance/chrominance    │
│ representation for each scanline from the Y value and the R value for │
│                              the scanline.                            │
└─────────────────────────────────────────────────────────────────┘
                                │
                                ▼
┌─────────────────────────────────────────────────────────────────┐
│  Deriving a second chrominance value of the luminance/chrominance   │
│ representation for each scanline from the Y value and the B value for │
│                              the scanline.                            │
└─────────────────────────────────────────────────────────────────┘
```

Fig. 5

CIS (CONTACT IMAGE SENSOR) RYB (RED-LUMINANCE-BLUE) SAMPLING

REFERENCE TO PENDING PRIOR PATENT APPLICATION

This patent application claims benefit of prior U.S. Provisional Patent Application Ser. No. 60/535,398, filed Jan. 9, 2004 by Derek T. Walton et al. for CIS RYB SAMPLING.

The above-identified patent application is hereby incorporated herein by reference.

FIELD OF THE INVENTION

This invention relates to office automation products in general, and more particularly to printers, fax machines, scanners, copiers and the like. Even more particularly, this invention relates to the integration of formerly separate functions into single devices such as those sometimes referred to as MFPs (Multi-Functional-Peripherals), and the integration of multiple functions into a single ASIC (Application Specific Integrated Circuit) such as those produced by Oasis Semiconductor, Inc. of Waltham, Mass.

BACKGROUND OF THE INVENTION

Overview

This invention relates to a novel system to reduce the amount of digital computation required when performing color image processing on images acquired from scan systems based on color CIS (Contact Image Sensor) scanner devices.

Description of Color CIS Scanner Device

To scan a document with a CIS device, the document is passed across the face of the CIS device (or, alternatively, the CIS device is passed across the document which is being scanned). The document is thus typically in contact with the CIS device. To scan an 8½"×11" paper formats, for instance, a CIS device with an image sensor size of at least 8½" is required.

The CIS device senses a document's scanlines, one scanline at a time, as the document passes across the face of the CIS device. The scanning process can thus be thought of (somewhat simplistically) as a sequence of repeated operations in which (i) the CIS device senses a scanline of the document and then (ii) the document is moved by a small amount across the face of the CIS.

The CIS device itself is an integrated unit consisting of a linear image sensor and a light source. For each scanline, the CIS device (i) illuminates a section of the document during a pulse period with a light source; (ii) collects the reflected light in its linear sensor array, and (iii) outputs a series of voltages representing the sensed light intensities. A computer chip collects this output and converts the data into a form suitable for performing image processing.

A color CIS device typically contains three different light sources which emit red, green and blue light, respectively. When performing color image sensing, the color CIS device is typically configured to illuminate and sense each document scanline position with three independent pulses of light—once with each of the three light sources. In this way, the red, green and blue tri-stimulus values can be obtained for each image pixel.

The CIS light sources are provided by arrays of red, green, and blue LEDs (Light Emitting Diodes). The LED arrays are typically configured in such a way that they have a common anode connection, but separate cathode connections, to the CIS device pins. This configuration allows the current which is passed through each of the LED arrays to be controlled independently, and thus, indirectly, allows independent control of the red, green, and blue light intensity.

Most scanner systems allow calibration of the red, green, and blue illumination used for each image scanline. For instance, calibration may be performed to obtain the optimal signal voltage from the CIS device. This is typically performed prior to carrying out a scan. Tuning of the illumination values is typically performed by adjusting the amount of time, during each image scanline time, for which current flows through the LED arrays. This is commonly referred to as tuning the LED on-times. The on-times of the red, green and blue arrays are typically calibrated independently, as the characteristics of the red, green, and blue LED arrays tend to differ.

Typical Color Scanning Method

During a first pulse for any particular scanline, the red LEDs are turned on for the optimal on-time (Tr) and the reflected light is collected by the sensor array for the entire pulse period (see FIG. 1). Then a second pulse for that scanline is begun with the green LED for a time (Tg) and the reflected light collected. Finally, a third pulse is carried out wherein the blue LEDs are turned on for a time (Tb), and the reflected light is collected by the sensor. The order in which the different colored LEDs are turned on is not significant.

The Problem

When performing color image processing, it is advantageous to operate on color images represented in a luminance/chrominance color space rather than RGB (Red-Green-Blue) space for certain image processing outputs.

Examples of such luminance/chrominance color space are: YUV (Y—luminance, UV—color information), which is the basic color space of PAL, NTSC, and SECAM composite color video standards; YIQ (derived from YUV, where I is "in-phase" and Q is "quadrature"), which is also associated with the NTSC color video standard; YDbDr (also associated with SECAM); YCbCr (i.e., Luminance; Chroma:Blue; Chroma:Red), typically associated with digital video, from Recommendation ITU-R BT.601 (formerly CCIR 601)); Xerox/YES; PhotoYCC® (Eastman Kodak) and CIELAB.

Examples of image processing outputs for which it may be advantageous to work in the luminance/chrominance color space include, but are not limited to, standalone color copies and compression to the JPEG file format. Within MFPs, images in JPEG format are used, for instance, for scans to PC, for scans outputted directly to email, for color facsimile, for image archival onto a memory card, or for temporary image storage during collated copy operations.

Thus, before such image processing is carried out, it is generally necessary for the chip to convert the data obtained from the RGB space of the image sensor into the desired luminance/chrominance color space.

Prior Art Solutions

The traditional method of performing the conversion of RGB space to luminance/chrominance color space is to have the chip perform a set of computations that use digital representations of the RGB values as input.

To convert to YCbCr, for instance, a chip or firmware might perform the following set of computations:

Y=0.29900*R+0.58700*G+0.11400*B

Cb=−0.16874*R−0.33126*G+0.50000*B

Cr=0.50000*R−0.41869*G−0.08131*B

Alternatively, the chip may use a 3-D table lookup with interpolation to map from RGB space to the luminance/chrominance color space.

Goals

It would, therefore, be advantageous to reduce the computational load on a chip in converting from an RGB color space to a luminance/chrominance color space.

SUMMARY OF THE INVENTION

The present invention solves this problem by providing a method that reduces the amount of digital computation required when performing color image processing on images acquired from scan systems based on color CIS (contact image sensor) devices that requires the use of luminance/chrominance color space.

In one preferred form of the invention, there is provided a method of directly obtaining a Y value for a luminance/chrominance representation of a scanline of a color scanned image produced by a color contact image sensor device having a linear sensor array to collect reflected light, wherein said contact image sensor device comprises red, green and blue light sources and wherein an optimal on time for each of said light sources is calibrated, said method comprising the step of illuminating said scanline during a single pulse independently with said red, said green and said blue light sources and allowing the linear sensor array to accumulate the reflected light from all of said light sources, wherein:

illumination with said red light source is for a first fraction of the optimal on time determined for said red light source, wherein said first fraction is derived from a known relationship between Y and said red light source;

illumination with said green light source is for a second fraction of the optimal on time determined for said green light source, wherein said second fraction is derived from a known relationship between Y and said green light source; and illumination with said blue light source is for a third fraction of the optimal on time determined for said blue light source, wherein said third fraction is derived from a known relationship between Y and said blue light source.

In another preferred form of the invention, there is provided a method of obtaining a chrominance value for a luminance/chrominance representation of a scanline of a scanned image produced by a color contact image sensor device having a linear sensor array to collect reflected light, wherein said contact image sensor device comprises red, green and blue light sources and wherein an optimal on time for each of said light sources is calibrated, comprising the steps of:

directly obtaining a luminance value (Y) of said luminance/chrominance representation using the method described above.

obtaining a R value by illuminating said scanline with said red light source for the optimal on time and collecting said reflected light;

obtaining a B value by illuminating said scanline with said blue light source for the optimal on time and collecting said reflected light; and deriving said chrominance value from said luminance value and one of said R or B values based upon known relationships between all of said values.

In another preferred form of the invention, there is provided a method of producing an output of a scanned color image of a document in a luminance/chrominance representation using a color contact image sensor device having a linear sensor array to collect reflected light, wherein said contact image sensor device comprises red, green and blue light sources and wherein the optimal on time for each of said light sources is calibrated, said method comprising the steps of:

obtaining a Y value for each scanline of said document using the method described above;

obtaining a R value for each scanline by illuminating each scanline of said document with said red light source for the optimal on time determined for said red light source and detecting the reflected light in said linear sensor array;

obtaining a B value for each scanline of said document by illuminating each scanline with said blue light source for the optimal on time determined for said blue light source and detecting the reflected light in said linear sensor array;

deriving a first chrominance value of said luminance/chrominance representation for each scanline from said Y value and said R value for said scanline; and deriving a second chrominance value of said luminance/chrominance representation for each scanline from said Y value and B value for said scanline.

In another preferred form of the invention, there is provided a computer chip programmed to control the production of a chrominance/luminance representation of a scanned color image of a document through the use of a color contact image sensor device, wherein said color contact image sensor device comprises (i) a linear sensor array to collect reflected light, and (ii) red, green and blue light sources; wherein said chip controls:

the calibration of an optimal on time for each of said red, green and blue light sources;

determining a Y value for each scanline of said document using the method described above;

determining a R value for each scanline by illuminating each scanline of said document with said red light source for the optimal on time determined for said red light source and detecting the reflected light in said linear sensor array;

determining a B value for each scanline of said document by illuminating each scanline with said blue light source for the optimal on time determined for said blue light source and detecting the reflected light in said linear sensor array;

determining a first chrominance value of said luminance/chrominance representation for each scanline from said Y value and said R value for said scanline;

determining a second chrominance value of said luminance/chrominance representation for each scanline from said Y value and B value for said scanline; and inputting said Y, first chrominance and second chrominance values for each scanline into an image processing path to produce said scanned color image.

In another preferred form of the invention, there is provided a method of producing an output of a scanned color image of a document in a luminance/chrominance representation using a color contact image sensor device having a linear sensor array to collect reflected light, wherein said contact image sensor device comprises red, green and blue light sources and wherein the optimal on time for each of said light sources is calibrated, said method comprising the steps of:

obtaining a Y value for each scanline of said document using the method described above;

obtaining a D value for each scanline by illuminating each scanline of said document with one or more of said red, green and blue light sources for the optimal on time determined for one or more of said light sources and detecting the reflected light in said linear sensor array;

obtaining a W value for each scanline of said document by illuminating each scanline with one or more of said red, green and blue light sources for the optimal on time determined for one or more of said light sources and detecting the reflected light in said linear sensor array;

deriving a first chrominance value of said luminance/chrominance representation for each scanline from two or more of said Y, D and W values for said scanline; and deriving a second chrominance value of said luminance/chrominance representation for each scanline from two or more of said Y, D and W values for said scanline.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein:

FIG. 5 is a flow chart of a method of producing an output of a scanned color image of a document in a luminance/chrominance representation of one embodiment of the present invention.

DETAILED DESCRIPTION OF THE PREFERRED EMBODIMENTS

Improved Solution

The present invention provides a system for reducing the computational complexity of converting to luminance/chrominance color space. Fundamental to this invention is taking advantage of the ability of the CIS device to accumulate, in one sensing operation, intensities resulting from periods of red, green and blue illumination. This allows for a direct determination of the luminance (Y) value in any luminance/chrominance color space where the luminance and chrominance components are simple linear functions of the RGB tri-stimulus values, and the luminance scaling coefficients are positive. These include, but are not limited to YUV, YIQ, YDbDr, YCbCr, and/or Xerox/YES.

By way of example, a particular image processing system might require a YCbCr representation of a scanned image. Looking at the above equations relating YCbCr to RGB, it is apparent that the Y component is formed as the sum of weighted contributions from red, green and blue illumination. Thus, it is possible to obtain a representation of Y directly from the CIS device by arranging the red, green and blue LED on-times during a single pulse to be representative of the red, green and blue contributions to Y. During each of the on-times, the sensor accumulates the reflected light (as voltages) from the different color LEDs. The sum of those reflected light voltages is the value for Y.

More particularly, assume that the calibrated red, green and blue LED array on-times are Tr, Tg and Tb, respectively. The on-time required to create Y from the CIS device directly is thus as follows:

$Ty,r = 0.29900 * Tr$ $Ty,g = 0.58700 * Tg$ $Ty,b = 0.11400 * Tb$

The on-times required to create Y from the CIS device in other luminance/chrominance color spaces can similarly be calculated based upon the well-known relationship between Y and R, G and B in those other spaces.

Figure 1:
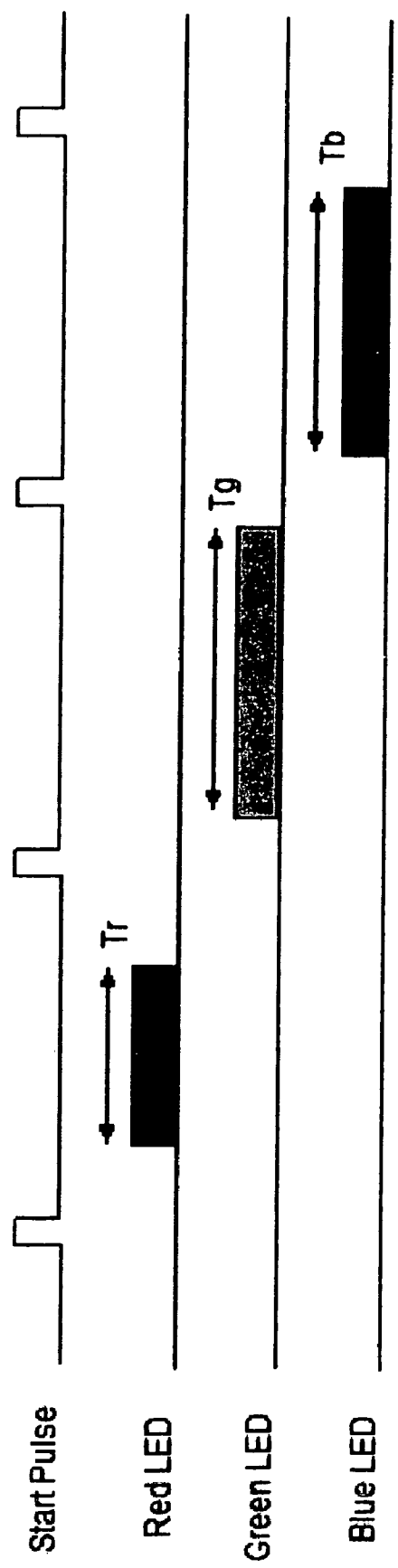
FIG. 1 is a schematic illustration of a typical color scanning method.
Figure 2:
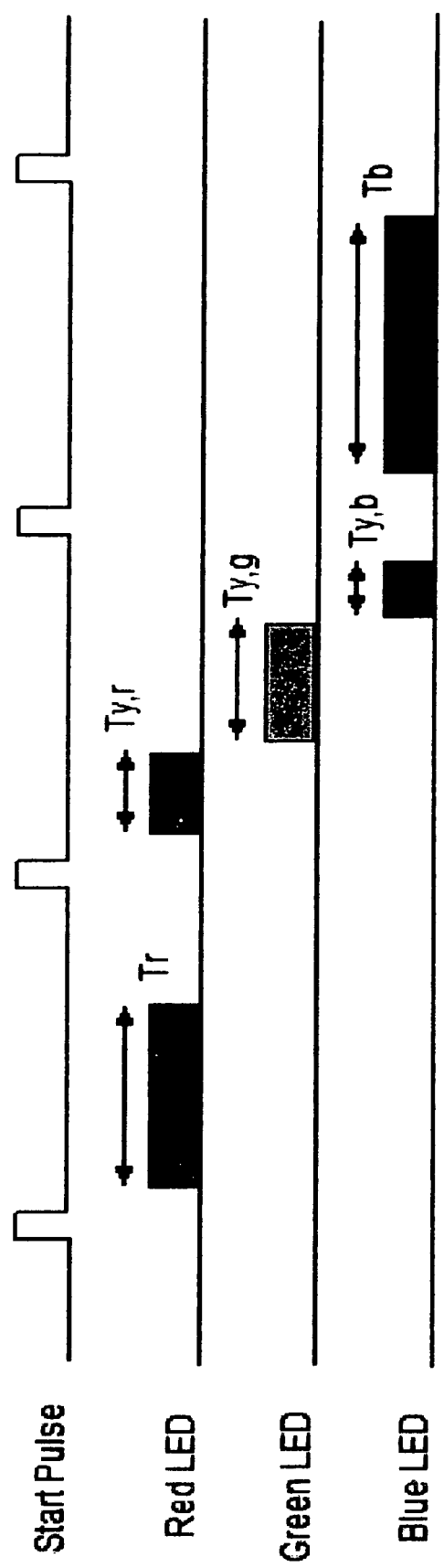
FIG. 2 illustrates the color scanning method of the present invention.
Figure 3:
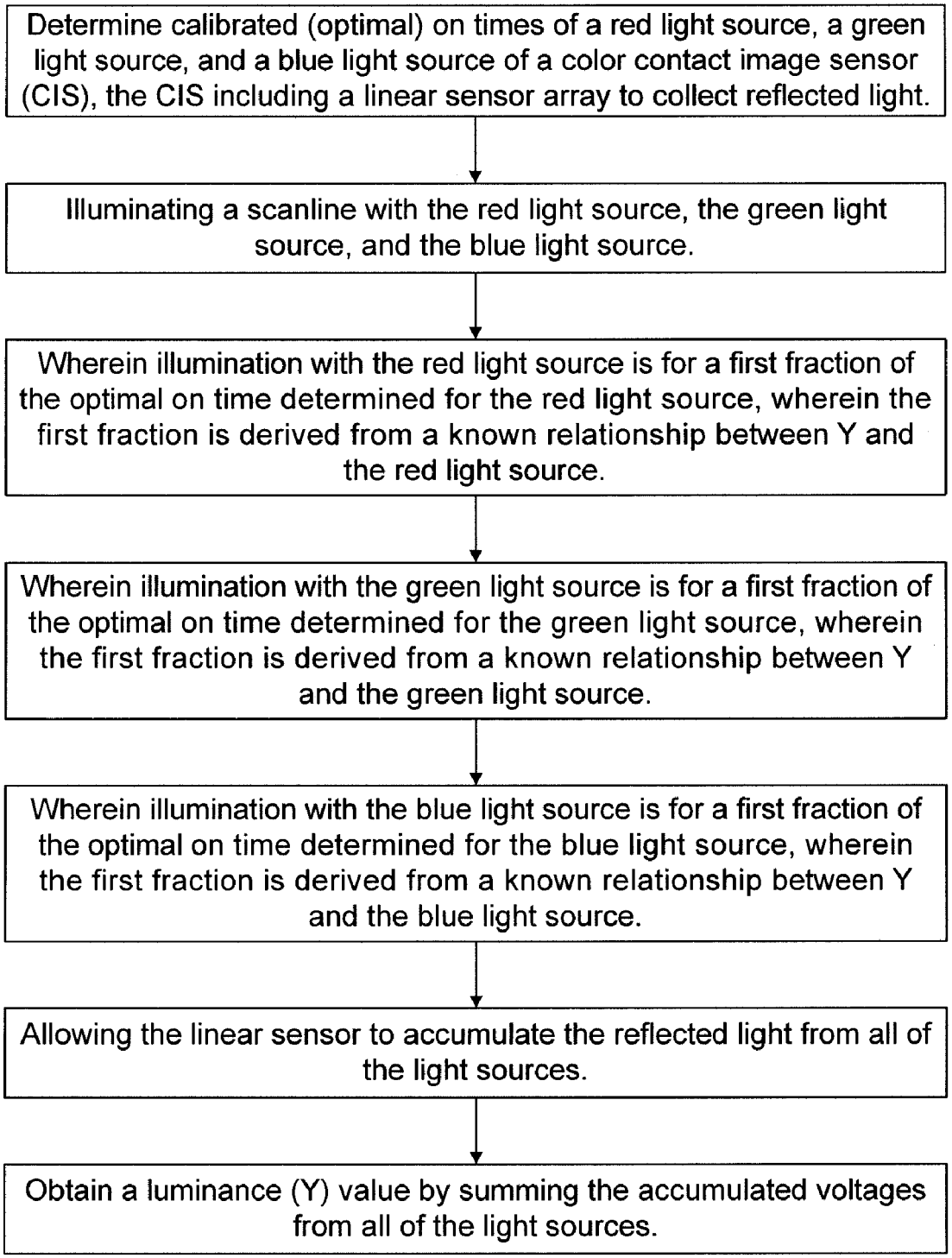
FIG. 3 is a flow chart of a method of directly obtaining a luminance (Y) value for a luminance/chrominance representation of a scanline of a color scanned image of one embodiment of the present invention.
Figure 4:
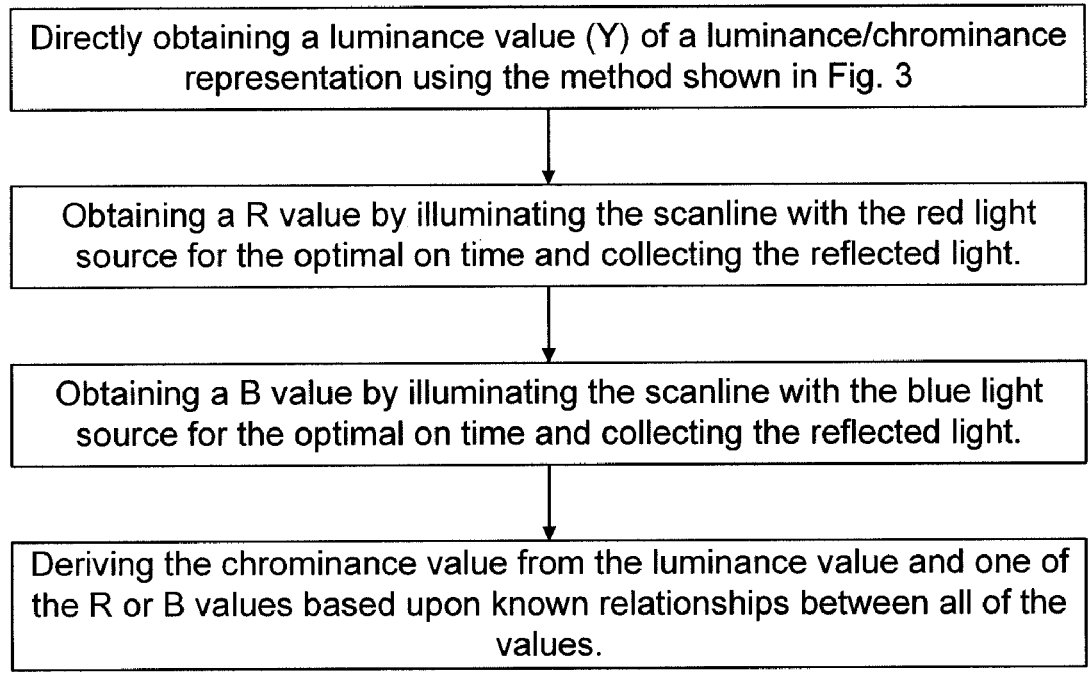
FIG. 4 is a flow chart of a method of obtaining a chrominance value for a luminance/chrominance representation of a scanline of a scanned image of one embodiment of the present invention.

Unfortunately, Cr (Chroma:Red) and Cb (Chroma:Blue) cannot be synthesized in a similar manner as Y because, in some cases, the R (Red), G (Green) and B (Blue) contributions are subtractive. Thus, instead of obtaining Cr and Cb, the standard R and B components from the CIS device are used. The sequence of LED on-times to achieve this selection of components RYB (Red-Yellow-Blue) is illustrated in FIG. 2.

After obtaining the standard R and B components from the CIS device, the pixels are now in a hybrid RYB color space. Significantly, the hybrid RYB color space can easily be converted to a YCbCr color space. With minor modifications, the equations mapping RGB to YCbCr can be rearranged to yield Cr and Cb as a function of RYB:

$Cr = 0.71327 * (R-Y)$ $Cb = 0.56433 * (B-Y)$

Thus, by changing the usage of the CIS device to obtain RYB rather than RGB, the computations required to obtain luminance/chrominance representation of pixels (i.e., the YCbCr color space in our example) are dramatically reduced.

For many image processing tasks, using a strictly defined luminance/chrominance color space such as the YCbCr color space in the foregoing example is not essential. For instance, an alternate luminance/chrominance color space can be defined which uses the same equation for luminance as the YCbCr color space but for which only subtract and shift operations are required in calculating the chrominance components, as follows:

$Cr' = (R-Y) >> 1$ $Cb' = (B-Y) >> 1$

This alternate luminance/chrominance color space preserves the characteristic of the YCbCr color space that neutral (i.e., gray only) tones occur when Cr=Cb=0. Significantly, these alternate Cr' and Cb' values are much simpler to compute because multiplication is no longer needed.

In many cases the image processing path requires the use of a 3-D color lookup table to convert from the image processing input color space to the output color space. This method is generally used to convert from the image processing input color space to the CMYK (Cyan Magenta Yellow blacK) color space which is typical of many printing devices. In one preferred embodiment of the present invention, the image processing path uses a 3-D color lookup table. In this embodiment, the chip calculates the simpler Cr' and Cb' values and performs image processing based on YCb'Cr' as input. To correctly map to CMYK, the 3-D color lookup table used during the color space conversion step is simply configured to map from YCb'Cr' to CMYK rather than from YCbCr to CMYK.

It should be appreciated that other luminance/chrominance systems can be utilized by modifying the calculations presented above. Such modifications will be readily apparent to one of ordinary skill in the art based upon known relationships between the chrominance and luminance value in any given system and between the chrominance and luminance values in such a system and R, G and B values.

It should further be appreciated that it may be advantageous to configure the CIS device to acquire samples which represent different linear combinations of R, G, and B tri-stimulus values than the RYB (Red-Luminance-Blue) components indicated in the above example. For instance, depending on the target luminance/chrominance system, it may be computationally more efficient to obtain GYB (Green-Luminance-Blue) components, RYG (Red-Luminance-Green) components, or even components of the form XYZ, where X and Z (like Y) represent linear combinations of the R, G, and B tri-stimulus values.

What is claimed is:

1. A method of directly obtaining a luminance (Y) value for a luminance/chrominance representation of a scanline of a color scanned image, the method comprising:
   determining calibrated on-times of a red light source, a green light source, and a blue light source of a color contact image sensor (CIS), the CIS including a linear sensor array to collect reflected light;
   wherein the calibrated on-times correspond to obtaining optimal signal voltages by the linear sensor array for a red-green-blue (RGB) color space when measuring the reflected light;
   illuminating the scanline with the red light source, the green light source, and the blue light source, wherein:
      illumination time with the red light source is a first fraction of the calibrated on-time determined for the red light source, wherein the first fraction is derived from a known relationship between Y and the red light source;
      illumination time with the green light source is a second fraction of the calibrated on-time determined for the green light source, wherein the second fraction is derived from a known relationship between Y and the green light source; and
      illumination time with the blue light source is a third fraction of the calibrated on-time determined for the blue light source, wherein the third fraction is derived from a known relationship between Y and the blue light source;
   accumulating reflected light from all of the light sources at the linear sensor array, wherein the reflected light is accumulated as a plurality of reflected light voltage values; and
   obtaining the luminance (Y) value by summing the plurality of reflected light voltage values.

2. The method of claim 1, wherein the Y value is part of a Luminance Chroma:Blue Chroma:Red (YCbCr) representation of the scanline, and wherein:
   the first fraction is 0.299;
   the second fraction is 0.587; and
   the third fraction is 0.114.

3. A method of obtaining a chrominance value for a luminance/chrominance representation of a scanline of a scanned image, the method comprising:
   determining calibrated on-times of a red light source, a green light source, and a blue light source of a color contact image sensor (CIS), the CIS including a linear sensor array to collect reflected light;
   wherein the calibrated on-times correspond to obtaining optimal signal voltages by the linear sensor array for a red-green-blue (RGB) color space when measuring the reflected light;
   directly obtaining a luminance value (Y) of the luminance/chrominance representation by:
      during a first time period, illuminating the scanline with the red light source, the green light source, and the blue light source, wherein:
         illumination time with the red light source is a first fraction of the calibrated on-time determined for the red light source, wherein the first fraction is derived from a known relationship between Y and the red light source;
         illumination time with the green light source is a second fraction of the calibrated on-time determined for the green light source, wherein the second fraction is derived from a known relationship between Y and the green light source; and
         illumination time with the blue light source is a third fraction of the calibrated on-time determined for the blue light source, wherein the third fraction is derived from a known relationship between Y and the blue light source;
      during the first time period, accumulating reflected light from all of the light sources at the linear sensor array, wherein the reflected light is accumulated as a plurality of reflected light voltage values; and
      summing the plurality of reflected light voltage values accumulated during the first time period;
   during a second time period that is different from the first time period, obtaining a red contribution to Y (R value) by illuminating the same scanline with the red light source for the calibrated on-time of the red light source and collecting the reflected light;
   during a third time period that is different from the first time period, obtaining a blue contribution to Y (B value) by illuminating the scanline with the blue light source for the calibrated on-time of the blue light source and collecting the reflected light; and
   deriving at least one chrominance value from the Y value and one of the R or B values based upon known relationships between all of the values.

4. The method of claim 3, wherein the chrominance value is a Chroma:Red (Cr) value of a Luminance Chroma:Blue Chroma:Red (YCbCr) representation of the scanline, wherein the Y value is part of the YCbCr representation of the scanline, and wherein the first fraction is 0.299, the second fraction is 0.587, and the third fraction is 0.114; and wherein the Cr value is derived by multiplying the difference between the R value and the obtained Y value by 0.71327.

5. The method of claim 3, wherein the chrominance value is a Chroma:Blue (Cb) value of a Luminance Chroma:Blue Chroma:Red (YCbCr) representation of the scanline, wherein the Y value is part of the YCbCr representation of the scanline, and wherein the first fraction is 0.299, the second fraction is 0.587, and the third fraction is 0.114; and wherein the Cb value is derived by multiplying the difference between the B value and the obtained Y value by 0.56433.

6. A method of producing an output of a scanned color image of a document in a luminance/chrominance representation, the method comprising:
- determining calibrated on-times of a red light source, a green light source, and a blue light source of a color contact image sensor (CIS), the CIS including a linear sensor array to collect reflected light;
- wherein the calibrated on-times correspond to obtaining optimal signal voltages by the linear sensor array for a red-green-blue (RGB) color space when measuring the reflected light;
- directly obtaining a luminance value (Y) for each scanline of the document by:
  - during a first time period, illuminating the scanline with the red light source, the green light source, and the blue light source, wherein:
    - illumination time with the red light source is a first fraction of the calibrated on-time determined for the red light source, wherein the first fraction is derived from a known relationship between Y and the red light source;
    - illumination time with the green light source is a second fraction of the calibrated on-time determined for the green light source, wherein the second fraction is derived from a known relationship between Y and the green light source;
    - illumination time with the blue light source is a third fraction of the calibrated on-time determined for the blue light source, wherein the third fraction is derived from a known relationship between Y and the blue light source;
  - during the first time period, accumulating reflected light from all of the light sources at the linear sensor array, wherein the reflected light is accumulated as a plurality of reflected light voltage values; and
  - summing the plurality of reflected light voltage values accumulated during the first time period;
- during a second time period that is different than the first time period, obtaining a red contribution to Y (R value) for each scanline by illuminating each scanline of the document with the red light source for the calibrated on-time determined for the red light source and detecting the reflected light in the linear sensor array;
- during a third time period that is different than the first time period, obtaining a blue contribution to Y (B value) for each scanline of the document by illuminating each scanline with the blue light source for the calibrated on-time determined for the blue light source and detecting the reflected light in the linear sensor array;
- deriving a first chrominance value of the luminance/chrominance representation for each scanline from the Y value and the R value for the scanline; and
- deriving a second chrominance value of the luminance/chrominance representation for each scanline from the Y value and B value for the scanline.

7. The method of claim 6 further comprising:
- inputting the Y, first chrominance and second chrominance values for each scanline into an image processing path to produce the outputted scanned image.

8. The method of claim 7, wherein the luminance/chrominance representation is a Luminance Chroma:Blue Chroma:Red (YCbCr) representation; wherein the Y value is part of the YCbCr representation, and wherein the first fraction is 0.299, the second fraction is 0.587, and the third fraction is 0.114; and the first chrominance value is derived for each scanline by multiplying the difference between the R value and the Y value by 0.71327; and the second chrominance value is derived for each scanline by multiplying the difference between the B value and the Y value by 0.56433.

9. The method of claim 1, further comprising:
- obtaining a green contribution to Y (G value) by illuminating the scanline with the green light source for the calibrated on-time of the green light source and collecting the reflected light;
- obtaining a blue contribution to Y (B value) by illuminating the scanline with the blue light source for the calibrated on-time of the blue light source and collecting the reflected light; and
- deriving at least one chrominance value from the Y value and one of the G or B values based upon known relationships between all of the values.

10. The method of claim 1, further comprising:
- obtaining a red contribution to Y (R value) by illuminating the scanline with the red light source for the calibrated on-time of the red light source and collecting the reflected light;
- obtaining a green contribution to Y (G value) by illuminating the scanline with the green light source for the calibrated on-time of the green light source and collecting the reflected light; and
- deriving at least one chrominance value from the Y value and one of the R or G values based upon known relationships between all of the values.

11. The method of claim 1, wherein the Y value is part of one of a YUV, YIQ, YDbDr, and Xerox/YES representation of the scanline.

12. The method of claim 3, wherein deriving at least one chrominance value comprises:
- deriving an estimated Chroma:Blue (Cb) value of a Luminance Chroma:Blue Chroma:Red (YCbCr) representation of the scanline by subtracting the Y value from the B value; and
- deriving an estimated Chroma:Red (Cr) value of a Luminance Chroma:Blue Chroma:Red (YCbCr) representation of the scanline by subtracting the Y value from the R value.

13. The method of claim 12, further comprising:
- determining Cyan Magenta Yellow Black (CMYB) values based on a predetermined relationship between the Y value, the estimated Cb and Cr values, and the CMYB values.

14. The method of claim 13, wherein the CMYB values are determined using a lookup table.

15. The method of claim 14, wherein the lookup table comprises a 3-D color lookup table configured to map from the Y value, the estimated Cb value, and the estimated Cr value to the CMYB values.

16. A method of obtaining a chrominance value for a luminance/chrominance representation of a scanline of a scanned image, the method comprising:
- determining calibrated on-times of a red light source, a green light source, and a blue light source of a color contact image sensor (CIS), the CIS including a linear sensor array to collect reflected light;
- wherein the calibrated on-times correspond to obtaining optimal signal voltages by the linear sensor array for a red-green-blue (RGB) color space when measuring the reflected light;
- during a first period, illuminating the scanline with each of the red, green, and blue light sources for predetermined fractions of the calibrated on-times;
- during a second period, illuminating the same scanline with at least one of the red and blue light sources for the respective calibrated on-times;

directly obtaining a luminance value (Y) of the luminance/chrominance representation by summing each of the signal voltages produced by the linear sensor array during the first time period; and deriving at least one chrominance value from the Y value and a signal voltage value produced by the linear sensor array during the second time period.

17. The method of claim 16, wherein the chrominance value is selected from the group comprising a Chroma:Red (Cr) value and a Chroma:Blue (Cb) value of a Luminance Chroma:Blue Chroma:Red (YCbCr) representation of the scanline, wherein the Y value is part of the YCbCr representation of the scanline, and wherein the first fraction is 0.299, the second fraction is 0.587, and the third fraction is 0.114; and wherein the Cr value is derived by multiplying the difference between the R value and the obtained Y value by 0.71327, and the Cb value is derived by multiplying the difference between the B value and the obtained Y value by 0.56433.

* * * * *